US005748291A

United States Patent [19]

Cameron

[11] Patent Number: 5,748,291

[45] Date of Patent: May 5, 1998

[54] FILM LOADING DEVICE

[75] Inventor: Robert Joseph Cameron, Hilton, N.Y.

[73] Assignee: Eastman Kodak Company, Rochester, N.Y.

[21] Appl. No.: 659,484

[22] Filed: Jun. 6, 1996

[51] Int. Cl.[6] .......... G03B 27/62

[52] U.S. Cl. .......... 355/75

[58] Field of Search .......... 355/75, 76; 396/647, 396/429, 511, 512, 513, 514, 516, 589, 594, 598

[56] References Cited

U.S. PATENT DOCUMENTS

| | | | |
|---|---|---|---|
| 3,266,407 | 8/1966 | Lucas | 354/313 |
| 3,388,653 | 6/1968 | Mayfield | 95/89 |
| 3,568,587 | 3/1971 | Laval | 95/90.5 |
| 3,728,949 | 4/1973 | Edwards | 95/31 |
| 3,776,110 | 12/1973 | Clayton | 95/1 |
| 4,235,532 | 11/1980 | Norris | 352/82 |
| 4,577,947 | 3/1986 | Fox et al. | 354/275 |
| 4,609,271 | 9/1986 | Watanabe | 354/202 |
| 4,831,401 | 5/1989 | Ucheyama et al. | 354/319 |
| 5,229,802 | 7/1993 | Shiota et al. | 354/275 |
| 5,333,033 | 7/1994 | Blackman | 355/27 |
| 5,452,037 | 9/1995 | Blackman | 354/275 |
| 5,521,662 | 5/1996 | Suzuki | 354/76 |
| 5,568,215 | 10/1996 | Haugen, Sr. et al. | 396/512 |
| 5,608,485 | 3/1997 | Kataoka et al. | 396/514 |

FOREIGN PATENT DOCUMENTS

| | | | |
|---|---|---|---|
| 0 628 871 | 12/1994 | European Pat. Off. . | |
| 0 628 871 A1 | 12/1994 | European Pat. Off. | G03D 13/00 |

*Primary Examiner*—Safet Metjahic
*Assistant Examiner*—Christopher E. Mahoney
*Attorney, Agent, or Firm*—Frank Pincelli

[57] ABSTRACT

A holder for holding a film cartridge having a non-light-tight film exit/entry opening. The holder includes a chamber formed in the holder shaped so as to receive and retain therein a film cartridge having a non-light-tight film exit/entry opening. A light-tight opening is provided in the holder adjacent the exit/entry opening such that the filmstrip within the cartridge can be passed through the light-tight opening.

16 Claims, 4 Drawing Sheets

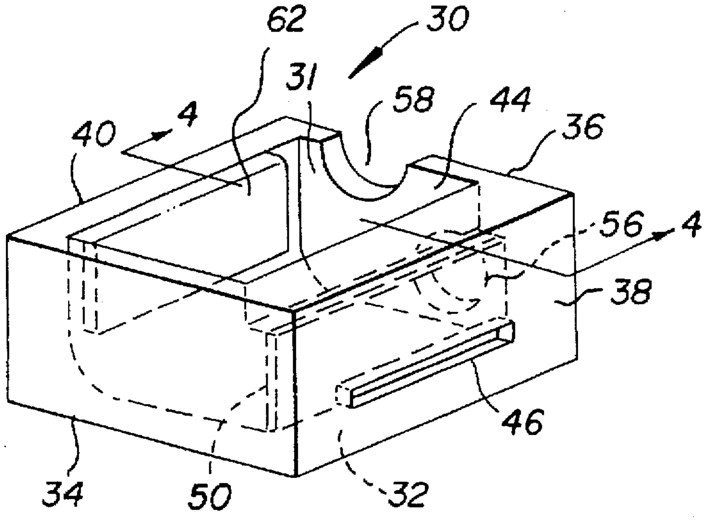
FIG. 3
FIG. 4
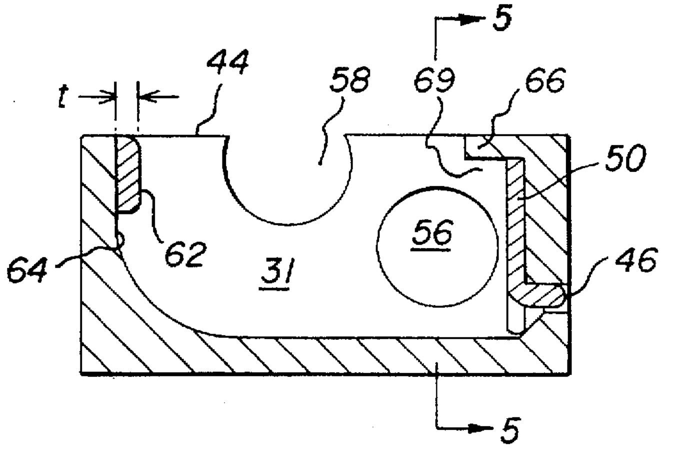
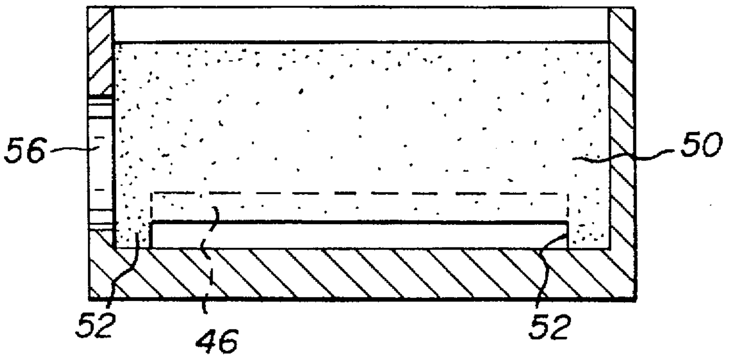
FIG. 5

FILM LOADING DEVICE

FIELD OF THE INVENTION

The present invention relates generally to the field of photography; and in particular, to film processing. More specifically, the present invention relates to processing film directly from a film cartridge which utilizes a non-light-tight film exit/entry.

BACKGROUND OF THE INVENTION

In typical minilab prior art processors, film is removed from a cartridge and adhered onto a leader card which is driven through the processor. In a typical conventional film cartridge, i.e., 35 mm film cartridge, film exits a light-tight opening, commonly referred to as a plush. Briefly, the plush comprises a narrow slit opening through which the filmstrip can be passed having a sufficient amount of material surrounding the slit opening which prevents light from exposing the film contained therein. Typically, only a small length of film is taken out of the cartridge, i.e., generally referred to as the leader portion, which is then attached to a leader card. The leader card and film cartridge are placed within a receiving daylight loading area of the minilab such that when the door to the loading area is closed, the cartridge will be in a light-tight environment. Thereafter, the leader card is taken through the processor whereby the undeveloped exposed film is taken out of the cartridge. Once all of the film has been taken out of the cartridge, the filmstrip is cut from the cartridge. An important aspect of this type of processing is that the leader portion of the filmstrip be taken out of the light-tight plush without disturbing light sensitivity in the remaining film contained within the cartridge.

Recently there has been developed a new type of film cartridge often referred to as the thrust type, such as disclosed and described in U.S. Pat. No. 4,834,306, which is hereby incorporated by reference. In this particular type film cartridge the filmstrip can be thrust out of, or back into the cartridge by rotation of the spool. A light valve is provided for opening and closing the opening through which the film can be thrust out of or back into the cartridge. A problem with such cartridges is that when the light valve is in the open position the film contained within the cartridge can be effected by light entering there through. Thus, the opening, when the light valve is open, is not light-tight as in conventional type cartridges. This presents a problem in developing a film in daylight load conditions as is typical with many minilabs and other type processing equipment.

A suggested solution to the forgoing problem is to transfer the film from the thrust type cartridge to a conventional type cartridge for use in the processing equipment. However, this requires additional parts and labor.

Applicants have invented a film cartridge holding device which quickly and easily allows the use of a thrust type film cartridge in daylight which is economical to build, easy to use, and can be placed directly in a processor without any need to reload the film onto a separate film cartridge, or require any modifications to the film processor.

SUMMARY OF THE INVENTION

A holder for holding a film cartridge having a non-light-tight film exit/entry opening. The holder comprising a chamber formed in said holder shaped so as to receive and retain therein a film cartridge having a non-light-tight film exit/entry opening. A light-tight opening is provided in said holder adjacent said exit/entry opening such that the filmstrip within said cartridge can be passed through said light-tight opening.

DESCRIPTION OF THE DRAWINGS

FIG. 3 discloses a film holding device made in accordance with the present invention for use in adapting a thrust type film cartridge for use in the daylight loading area of the processor;

FIG. 4 is a cross-sectional view of FIG. 3 as taken along line 4—4;

FIG. 5 is a cross-sectional view of the holder of FIG. 3 as taken along line 5—5;

DETAILED DESCRIPTION OF THE INVENTION

Figure 1:
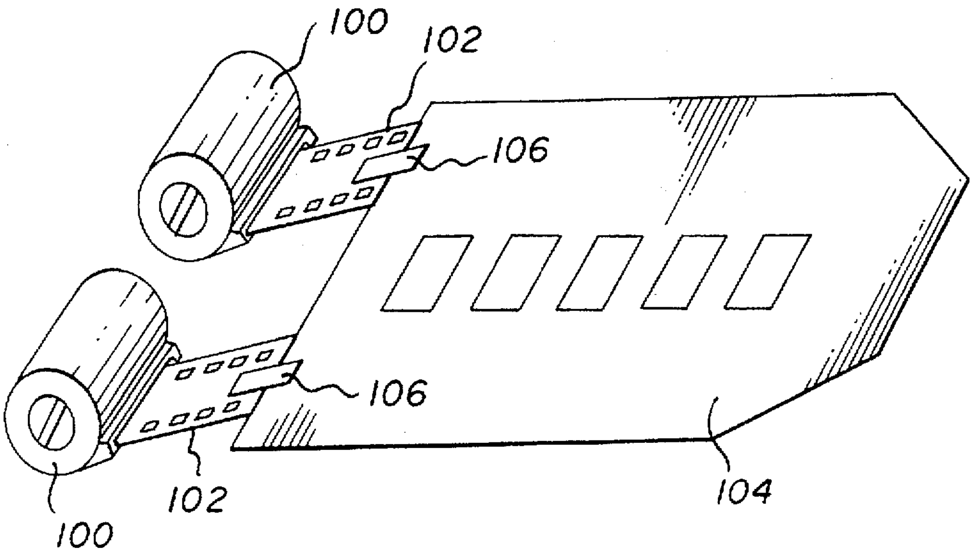
FIG. 1 is a perspective view of how prior art conventional cartridges are attached to a leader card for use in a film processor.

Referring to FIG. 1, there is illustrated a pair of conventional 35 mm film cartridges 100, each having a leader section 102 that has been pulled from the cartridges by conventional techniques and attached to a leader card 104 which is designed for use in a minilab for guiding of the film through the processor. An example of the typical minilab is the System 50 minilab made by the Eastman Kodak Company. As can be seen, a small piece of tape 106 is used to securely attach the leader 102 to the leader card 104. As is typical in such devices, a pair of filmstrips are taken simultaneously through the processor. However, it is to be understood that one or any number of filmstrips may be passed through the processor as desired.

Figure 2:
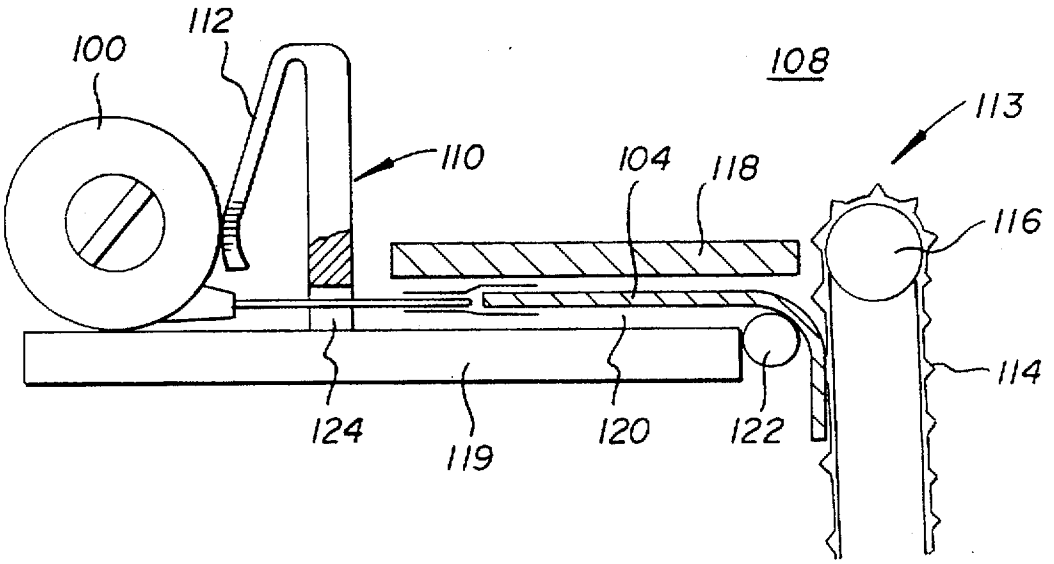
FIG. 2 is an enlarged side of the elevational view illustrating placement of the film cartridges of FIG. 1 into the daylight film loading area of the film processor.

Referring to FIG. 2, there is illustrated a partial elevational view of the cartridge daylight loading section 108 of a minilab processor illustrating two film cartridges 100 being attached a the leader card 104. The cartridge loading section 108 of the minilab includes a stop member 110 which has a forward extending flexible member 112 designed to engage the forward section of the cartridges 100. A transport mechanism 113 is provided for taking the leader card 104 and transporting it along with the film through the processor. In the particular embodiment illustrated, the transport mechanism 113 includes a drive belt 114 which extends around pulley 116. A guide plate 118 is provided which is substantially parallel to a support plate 119 so as to form a narrow passage 120 through which the leader card 104 and film pass. A guide roller 122 is provided for guiding the leader card 104 and film into engagement with the drive belt 114. The stop member 110 is provided with a narrow opening 124 through which the leader card and film passes. The flexible member 112 is connected to a switch (not shown) which is activated when a predetermined amount of force is applied to the flexible member. For example, when the film has been fully retracted from the cartridges 100 this will result in a force being applied to the spool which is secured to the trailing end of the film so as to press the cartridges 100 against flexible member 112. This will cause the switch to be activated, which in turn will activate a cutter (also not shown) to cut the end of the film from the cartridges 100. Thereafter, the cartridges 100 are removed and another pair of cartridges and leader card are placed in the loading mechanism.

Figure 7:
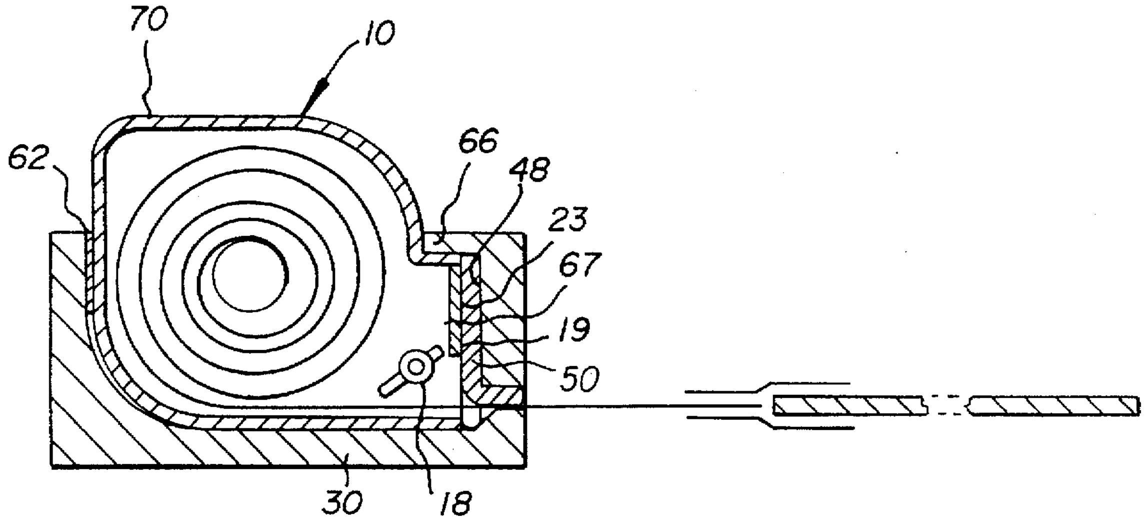
FIG. 7 is a front view of the holder of FIG. 3 holding a thrust type film cartridge illustrating that the cartridge can be accessed for thrusting the film and for opening of the light valve.
Figure 8:
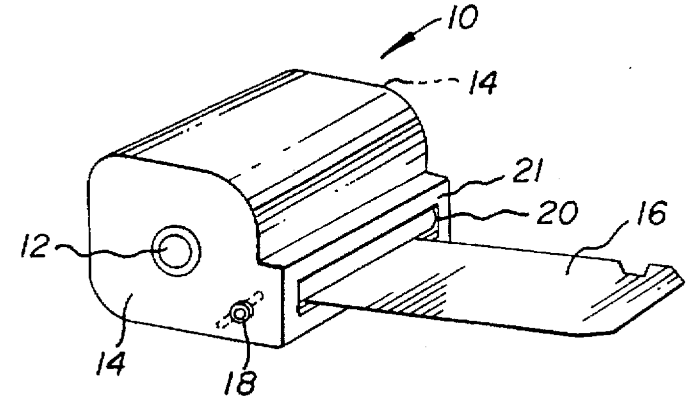
FIG. 8 is a cross-sectional view of the device of FIG. 7 taken along line 8—8 illustrating how the film contained therein would be attached to a conventional leader card for use in a film processor.
Figure 9:
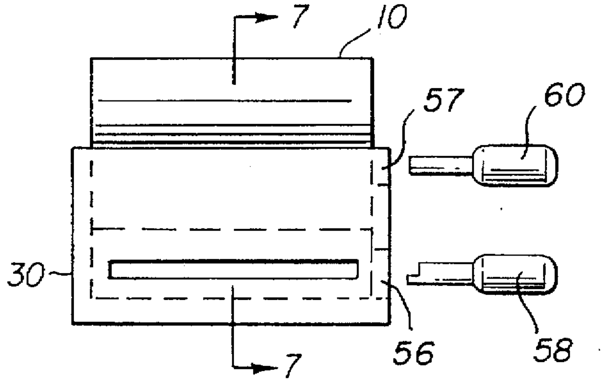
FIG. 9 is a perspective view of the film thrust cartridge of FIG. 7.

Referring to FIG. 9, there is illustrated a thrust-type cartridge such as disclosed in U.S. Pat. No. 4,834,306. The thrust cartridge 10 has a spool 12 rotatably mounted to the sides 14 of the cartridge 10. Spirally wrapped about the spool 12 is a strip 16 of photographic film. Preferably, the trailing end of the film is detachably secured to the spool 12. However, the trailing end need not be detachably mounted to the spool 12. The cartridge 10 includes a light-lock door or valve 18 which is also rotatably mounted to the sides 14 of the cartridge 10. The light valve 18 can be rotated between an open position as illustrated in FIGS. 7 and 8 to a closed position (not shown). When the light valve 18 is in the closed position, light does not enter the cartridge. However, when the light valve 18 is in the open position, light can enter the interior of the cartridge through opening 20 and potentially affect the end development of photosensitive material disposed therein.

Referring to FIGS. 3–6, there is illustrated a film loading device/holder 30 made in accordance with the present invention. The device 30 has an internal chamber 31 having a bottom wall 32, a pair of lateral walls 34, 36, a front wall 38, and back wall 40, which are shaped so that chamber 31 closely conforms to the outer configuration of the photographic film cartridge 10. An access opening 44 is provided for allowing placement and removal of the cartridge 10 in chamber 31. An exit opening 46 is provided in front wall 38 for allowing film 16 to exit from the cartridge 10 when the cartridge 10 is seated within chamber 31. The opening 46 has a height H sufficient for allowing film to exit. In the particular embodiment, the height H is about 0.060 inches (1.524 mm). The front wall 38 has an interior surface 48 which is designed to engage the face 19 of snout section 21 of cartridge 10 (see FIG. 7). The opening 46 is positioned in wall 38 such that it is co-aligned with the opening 20 in cartridge 10 when the cartridge 10 is seated in the chamber 31.

In the embodiment illustrated, there is provided a thin layer of material which is used to assist in preventing light from leaking through opening 46 into the chamber 31. As best seen in FIG. 5, the layer 50 extends both above the opening 46 and along the lateral walls 52. Preferably, in the embodiment illustrated, the material 50 extends into the opening 46 and is of a width W such that substantially no light will be allowed to enter into chamber 31, yet is sufficiently large so as to allow the filmstrip 16 to pass there through. In the particular embodiment illustrated, the material layer 50 is made of velvet like fabric and has a thickness of approximately 0.06 inches (1.524 mm), which is substantially equal to the height H of the opening 46. However, since the layer 50 is made of a soft compressible fabric, it easily compresses so as to allow film to exit opening 46.

Figure 6:
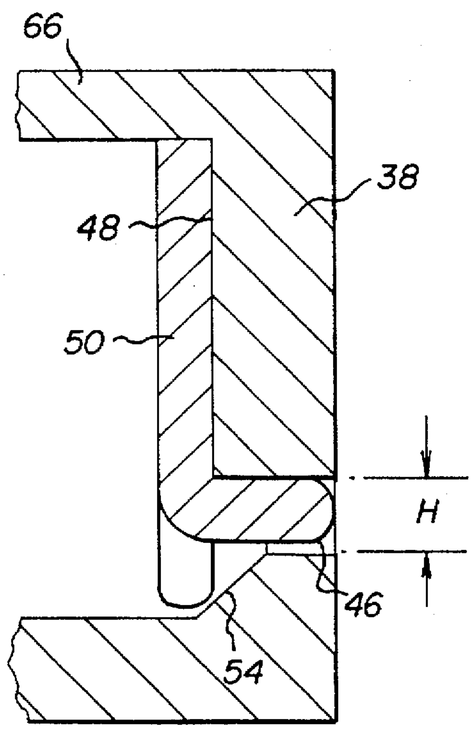
FIG. 6 is an enlarged partial view of the exit opening of the device as taken along broken line 6—6 of FIG. 4.

As illustrated in FIG. 6, a ramp section 54 is provided in wall 38 to help assistant and guide the leading end of the film through exit opening 46.

The side wall 36 of holder 30 is provided with a opening and/or cut-out section 56 which allows access to the light-lock door/valve 22 such that the valve 22 can be rotated to the opened or closed position by an appropriate tool 58 as illustrated in FIG. 9. The side wall 36 is further provided with a cut-out section 57 which allows access by a second tool 60 for engagement with the spool 12 for allowing thrusting of the film out of the cartridge through opening 46.

In the preferred embodiment illustrated, a retention pad 62 is provided on the interior surface of wall 40. The pad 62 is secured to wall 40 by any desired means. In the embodiment illustrated, the pad 62 is secured by an adhesive. The pad 62 is flexible so as to provide a retaining force against the cartridge so as to assist in retaining the cartridge with chamber 31. In the preferred embodiment illustrated, the pad 62 is made of a foam material which is easily compressible such as the type found in foam tape. However, any suitable foam material may be used. Also, in the embodiment illustrated, the pad 62 has a thickness t of about 0.1 inches (2.54 mm).

As previously discussed, the chamber 31 is shaped so as to conform substantially to the outer configuration of the cartridge. Preferably, as illustrated, the front wall 38 includes an overhanging lip section 66 designed to engage the outer surface 23 of the snout section 67 of cartridge 10 so as to provide a locking section 69 for snout section 67 in chamber 31. The side walls 34, 36, 38, 40 are appropriately sized such that when a cartridge 10 is inserted, as illustrated in FIG. 8, the force applied by the pad 62 allows the cartridge 10 to be retained within the chamber 31 by the frictional engagement therebetween. Thus, there is no requirement for any additional retaining means for retaining of the cartridge 10 within the chamber 31. Likewise, when it is desired to remove the cartridge 10, the cartridge 10 is simply grasped at its upper end 70, as illustrated in FIG. 8, and pulled out of chamber 31. As can be seen, the front portion of the snout section 67 of the cartridge is in intimate contact with the interior surface 48 of wall 38. In view of the plush layer 50 provided in the opening 46 and the area around opening 46, substantially no light can enter into the cartridge through the opening 20 when the light valve 18 is in the open position.

Figure 10:
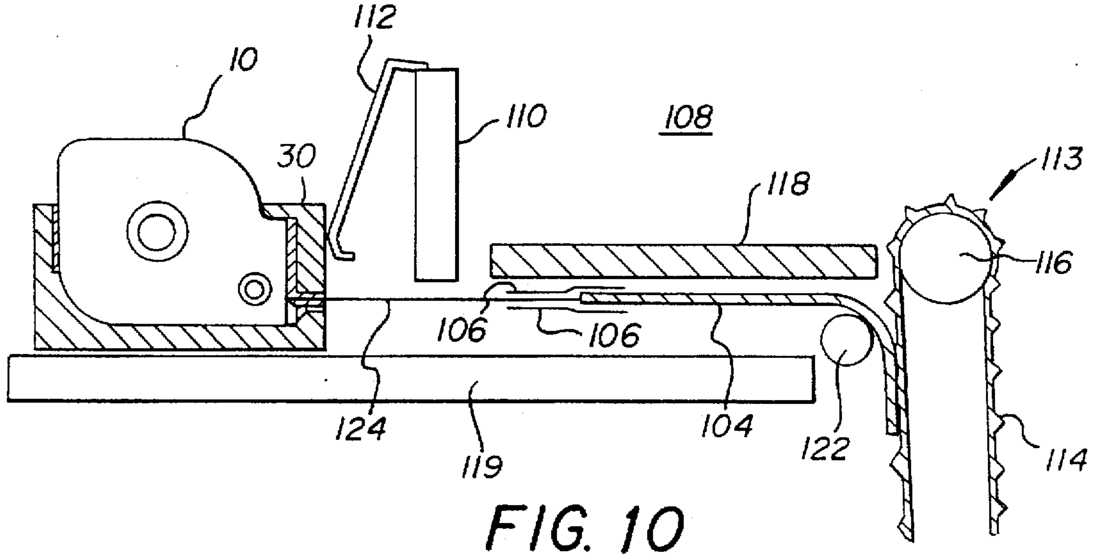
FIG. 10 is a cross-sectional view similar to FIG. 7 illustrating the device as mounted in a minilab for removing of the film from the cartridge.

In order to more fully understand the present invention a brief description of its use will now be discussed. First, a thrust-type cartridge 10 is provided having film contained therein and the light valve 18 being in the closed position. The cartridge 10 is placed within the chamber 31 of holder 30 such that it is retained snugly therein due to the frictional engagement of the cartridge 10 with the interior surface of the chamber 31. Thereafter, an appropriate tool 58 is used to open light valve 18. Then a second tool 60 is used to thrust a sufficient amount of film out of the cartridge through opening 20 and through opening 46 so as to allow attachment of the film leader to leader card 104. As the leading edge 72 of the film exits opening 20, it may hit ramp 54 which assists in guiding the film through opening 46. By continued rotation of the tool 60, the filmstrip 16 exits the holder 30. As illustrated in FIG. 8, tape strips 106 are used to secure the film to the card 104. After the appropriate number of cartridges have been secured to the leader card 104, the leader card 104 is placed into the loading mechanism under daylight load conditions as illustrated in FIG. 10. An appropriate cover/door (not shown) is initially opened so as to allow access to the loading mechanism and is then closed after the film and attached leader card is seated in the loading mechanism. Thus, when the door is closed the film will be in a dark environment. Thereafter, the film is pulled out by the leader card 10 until such time as a sufficient amount of resistive force is applied by the trailing end of the film (which is secured to the spool) is applied to flexible member 112, at which time the flexible member 112 would activate a switch (not shown) causing the cutting mechanism (not shown) to cut the filmstrip from the cartridge, allowing the film to be processed through the processor in a conventional manner. Thereafter, the light-tight door of the processor is opened and the holder 30 containing the cartridge 10 is removed. The old cartridge is removed and a fresh cartridge placed into the holder 30 for repeating of the process.

It can be seen that there is provided a simple film holding device which allows the cartridge having non-light-tight film exit/entry opening for use in a device designed to receive film having a light-tight opening.

It is to be understood that various modifications or changes may be made without departing from the scope of the present invention. The present invention being defined by the claims set forth below.

Parts list:

10 thrust cartridge
12 spool
14 sides
16 filmstrip
18 light-lock door/valve
19 front face
20 opening
21 snout section
23 outer surface
30 loading device/holder
31 chamber
32 bottom wall
34 lateral wall
36 lateral wall
38 front wall
40 back wall
44 access opening
46 opening
48 interior surface
50 layer
52 lateral walls
54 ramp section
57 cut-out section
58 tool
60 tool
62 retention pad
66 overhanging lip section
67 snout section
69 locking section
70 upper end
72 leading edge
100 cartridges
102 leader section
104 leader card
106 tape
108 loading section
110 stop member
112 flexible member

113 transport mechanism
114 drive belt
116 pulley
118 guide plate
119 support plate
120 narrow passage
122 guide roller
124 narrow opening

I claim:

1. A film loading holder for loading a filmstrip contained in a film cartridge having a non-light-tight film exit/entry opening into a photofinishing apparatus designed to receive film from a cartridge having a light-tight opening, said holder comprising;

a chamber formed in said holder, said chamber being shaped so as to receive and retain therein a film cartridge having a non-light-tight film exit/entry opening, said chamber also being shaped so as to provide a light-tight region around said exit/entry opening, said chamber having a front wall and a back wall, said front wall having a light-tight opening adjacent said exit/entry opening such that the filmstrip within said cartridge can be passed through said light-tight opening, said back wall having a compressible pad for retaining said film cartridge placed within said chamber;

wherein a thin layer of material is placed around said light-tight opening in said front wall, said thin layer of material extending into said light-tight opening, above said light-tight opening and on each lateral side of said light-tight opening.

2. A holder according to claim 1 wherein said chamber is shaped so as to receive a thrust type cartridge, said cartridge having an exit/entry door and a drive spool around which a filmstrip is wound.

3. A holder according to claim 2 wherein said holder is provided with an opening so as to allow access to said entry door for opening and/or closing of said door.

4. A holder according to claim 2 wherein said holder is provided with an opening so as to allow access to said spool so as to allow thrusting of the filmstrip out of said cartridge.

5. A holder according to claim 1 wherein a ramp section is provided in said holder adjacent said light-tight opening for guiding the filmstrip out of said light-tight opening.

6. A holder according to claim 1 wherein the front wall of said chamber mates with a front face of a snout section of the film cartridge.

7. A holder according to claim 1 wherein said holder has a lip section which forms a locking section for receiving the snout section of the film cartridge.

8. A holder for holding a film cartridge having a non-light-tight film exit/entry opening, the holder comprising;

a chamber formed in said holder, said chamber being shaped so as to receive and retain therein a film cartridge having a non-light-tight film exit/entry opening, said chamber having a front wall and a back wall, said front wall having a light-tight opening adjacent said exit/entry opening such that the filmstrip within said cartridge can be passed through said light-tight opening, said back wall having a compressible pad for retaining said film cartridge placed within said chamber;

wherein a thin layer of material is placed around said light-tight opening in said front wall, said thin layer of material extending into said light-tight opening, above said light-tight opening and on each lateral side of said light-tight opening.

9. A holder according to claim 8 wherein said chamber is shaped so as to receive a thrust type cartridge, said cartridge having an exit/entry door and a drive spool around which a filmstrip is wound.

10. A holder according to claim 9 wherein said holder is provided with an opening so as to allow access to said entry door for opening and/or closing of said door.

11. A holder according to claim 9 wherein said holder is provided with an opening so as to allow access to said spool so as to allow thrusting of the filmstrip out of said cartridge.

12. A holder according to claim 8 wherein a ramp section is provided in said holder adjacent said light-tight opening for guiding the filmstrip out of said light-tight opening.

13. A holder according to claim 8 wherein the front wall of said chamber mates with a front face of a snout section of the film cartridge.

14. A holder according to claim 11 wherein said thin layer of material has a thickness substantially equal to the height of said light-tight opening.

15. A holder according to claim 14 wherein said thin layer of material is compressible so as to allow film to easily pass through the light-tight opening.

16. A holder according to claim 8 wherein said holder has a lip section which forms a locking section for receiving a snout section of the film cartridge.

* * * * *

UNITED STATES PATENT AND TRADEMARK OFFICE

CERTIFICATE OF CORRECTION

PATENT NO. : 5,748,291

DATED : May 5, 1998

INVENTOR(S) : Robert J. Cameron

It is certified that error appears in the above-identified patent and that said Letters Patent is hereby corrected as shown below:

Title page, insert the following item:
-- [60] Provisional application No. 60/004,485, September 15, 1995. --.

Column 1, line 2, insert the following:
-- CROSS REFERENCE TO RELATED APPLICATION
Reference is made to and priority claimed from U.S. provisional application No. 60/004,485, filed September 15, 1995, entitled FILM LOADING DEVICE. --.

Signed and Sealed this

Tenth Day of November 1998

Attest:

BRUCE LEHMAN

*Attesting Officer* *Commissioner of Patents and Trademarks*